H. MARTIN & J. R. WHITE.
CAP FOR VALVES.
APPLICATION FILED DEC. 17, 1917.

1,270,641.

Patented June 25, 1918.

Inventor
Harry Martin and
John R. White,

By Lancaster ...
Their Attorneys

UNITED STATES PATENT OFFICE.

HARRY MARTIN AND JOHN R. WHITE, OF MILFORD, UTAH.

CAP FOR VALVES.

1,270,641.  Specification of Letters Patent.  Patented June 25, 1918.

Application filed December 17, 1917. Serial No. 207,567.

*To all whom it may concern:*

Be it known that we, HARRY MARTIN and JOHN R. WHITE, citizens of the United States, residing at Milford, in the county of Beaver and State of Utah, have invented a new and useful Cap for Valves, of which the following is a specification.

The present invention relates to valves, more particularly for use on pneumatic tires for automobiles, bicycles or the like, and relates more particularly to an improved cap structure for use in connection with valves of the Schrader type.

In the adjustment and repair of pneumatic tire valves, considerable difficulty and inconvenience is encountered in deflating the tire and in the removal and positioning of the valve stems and the parts carried thereby.

The object of this invention is to provide a cap structure which is provided with means for retaining the valve open for deflating the tire or tube so that it is unnecessary to project sticks and other like devices into the valve for holding it open, and by the use of which it is unnecessary to remove the valve stem and its parts to effect the deflation of the tire.

The invention also aims at the provision of a valve structure provided with means for enabling the quick and easy removal and positioning of the valve stem and its parts with the cap structure to thus prevent loss of the valve stem and mutilation of the packing rings carried on the stem.

The above and various other objects and advantages of this invention will be in part described in and in part understood from the following detailed description of the present preferred embodiment, the same being illustrated in the accompanying drawing, wherein.

Figure 1:
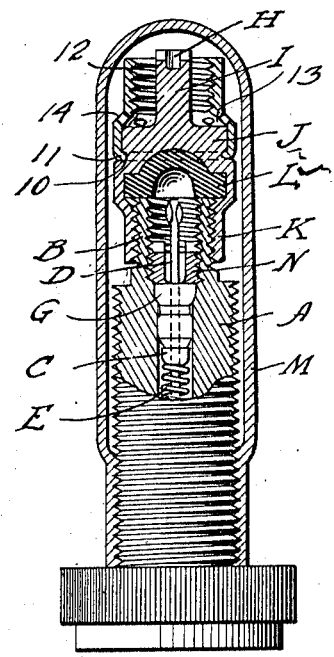
Figure 1 is a longitudinal section of a tire valve closed and having the cap secured in closed position thereon and showing the outer cap applied to the valve.

Referring to this drawing A designates a valve stem of usual construction, such as employed in connection with pneumatic tires and provided with a reduced end B which is internally and externally threaded. The valve stem A carries a valve C upon a removable rod or stem D normally urged upward by a spring E toward a seat F also mounted on the stem D. A collar G is also mounted on the stem D near its upper end and adapted to seat in the outer end of the main stem A for slidably supporting the rod D and its parts. The upper end of the rod or stem D is flattened at opposite sides and adapted to be engaged in the kerf H formed in the usual manner upon the shank I of a valve cap J. The cap J is of usual form having an internally threaded flange K adapted to thread over the reduced end B of the valve stem and provided with a packing washer L adapted to seat against the outer end of the valve stem A.

The cap J is provided near its outer end with an annular exterior groove 10 into which is crimped or turned a flange 11 of a sleeve 12 which surrounds the outer end of the cap and terminates in a transverse plane lying inwardly of the plane of the end of the shank I. This collar 12 is internally threaded and of the same interior diameter as that of the cap flange K. The sleeve 12 is free to turn upon the cap J as will be hereinafter more particularly pointed out.

The sleeve 12 is enlarged at its inner end to form a shoulder 13 adapted to engage the outer end of the cap J, and which coöperates with the inturned flange 11 to retain the sleeve from longitudinal displacement from the cap.

The sleeve 12 is provided, in its shoulder 13, with a plurality of openings 14 for admitting escape of air under conditions subsequently to be described. An outer cap M provided with a reduced internally threaded end portion is detachably fitted over the main stem or casing A of the valve, and is adapted to entirely inclose the cap and the attachment applied thereto for protecting the same from dust and the weather.

In operation, as shown in Fig. 1, the cap J is used in the ordinary manner for sealing the valve body A. In this instance the sleeve 12 projects outward and is not used, and is of such dimension, and is so mounted upon the cap J that the sleeve may be housed within the outer cap M when the latter is in place. When the parts are assembled in this relation the valve stem D is free to rise through the internal nut N for closing the valve C.

Figure 2:
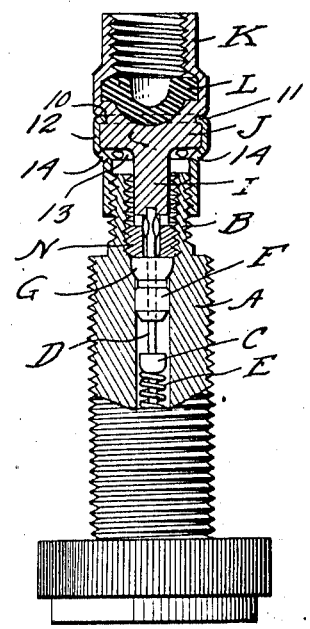
Fig. 2 is a similar view showing the outer cap removed and the cap of this invention inverted and in position for holding the valve open for admitting the escape of air through the valve.
Figure 3:
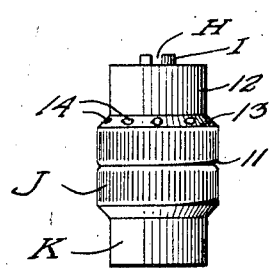
Fig. 3 is a side elevation of a valve cap constructed according to this invention.
Figure 4:
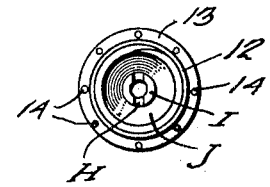
Fig. 4 is a top plan view of the same.

When it is desired to hold the valve C open, as shown in Fig. 2, it is only necessary to remove the cap J and thread the sleeve 12 over the reduced end B of the valve body with the shank I projecting in the usual manner into the valve body and against the upper end of the stem D. As the sleeve 12 is turned inwardly over the valve body the shank I depresses the valve stem D and forces the valve C into open position. Under these conditions air passes up through the collars F and G and the nut N into the sleeve 12 and out through the openings 14 thereof. The parts may be held in this position until the desired quantity of air is released through the valve. It will be noted that the cap J may be held from turning against the valve stem D and the nut N, thus preventing undue wear upon the sleeves and packing washers F and G. The kerf H of the shank I is adapted to receive the projections of the nut N in the usual manner when the sleeve 12 is turned down sufficiently over the valve casing. To remove the valve stem D and its parts it is then only necessary to back off the sleeve 12 and turn the cap J therewith to unscrew the nut N and draw the valve stem upward out of the casing.

The attachment may be readily applied to valve caps by merely forming the groove 10 in the latter and does not increase the length or size of the cap. The devices may be easily spun or otherwise suitably formed from metal at relatively low cost. By using the cap attachment of this invention it is unnecessary to withdraw the valve stem D when it is required to release a considerable amount of air. In the above description the valve and the cap with its attachment has been described with particular relation to a pneumatic tire, but it is to be understood that such reference is for the purpose of description only as the attachment may be applied to the caps of any valves embodying the parts which are adapted to coöperate with the attachment.

It is also of course understood that various changes and modifications may be made in the details of construction and design of the above embodiment of this invention without departing from the spirit thereof, such changes and modifications being restricted only by the scope of the following claims.

What is claimed is:

1. The combination with a valve casing open at one end, a normally seated spring pressed valve in the casing having a stem projecting toward the open end of the casing, and a cap adapted to fit over the open end of the casing to close the same when the valve is seated and having a shank on its outer end adapted to engage said valve stem when the cap is inverted, of a sleeve rotatably mounted upon the outer end of the cap adapted to be secured over the outer end of the valve casing while the cap and its shank are held from turning to maintain the stem of the valve in open position.

2. The combination with a valve casing having an open end interiorly and exteriorly threaded, an internal nut threaded in the open end of the casing and carrying a normally seated spring pressed valve with a stem projecting outwardly through the nut, and a cap adapted to be threaded over the open end of the casing for closing the same when the valve is seated and provided on its outer end with a shank for depressing the valve stem and for interlocking engagement with said internal nut when the cap is inverted, of a sleeve rotatably mounted on the outer end of the cap about said shank and having interior threads adapted to engage the exterior threads of the casing when the cap is inverted, said sleeve being adapted to be turned over the end of the casing independently of the cap to advance said shank against the valve stem and maintain the valve open, said sleeve being adapted to be turned simultaneously with the cap and with the internal nut to remove the same and the valve carried thereby.

3. The combination with a valve casing open at one end and having interior and exterior threads thereat, an internal nut threaded into the open end of the casing and carrying a normally seated spring pressed valve having a stem projecting above the nut, and a cap detachably threaded over the outer end of the stem to close it and having a shank on its outer end adapted to engage against said valve stem to depress the same and open the valve when the cap is inverted, said shank having a kerf in its outer end for interlocking engagement with the internal nut to position and remove the same, of a sleeve rotatably mounted upon the outer end of the cap and provided upon its inner end with an inturned flange for locking the sleeve on the cap, said sleeve having internal threads at its outer end and conforming in internal diameter to that of the cap for threaded engagement over the open end of the casing when the cap is inverted and having outlet openings in its sides beyond the end of the cap, said cap being adapted to be turned upon the end of the casing independently of the cap to advance said shank against the valve stem and hold the latter depressed, and being adapted to be turned with the cap from the end of the casing simultaneously with the internal nut to withdraw the latter from the casing.

HARRY MARTIN.
JOHN R. WHITE.